3,159,049
CONTROL LEVER REPLACEMENT ARM
Rudolph J. Lahti, 50 E. Main St., Gloucester, Mass.
Filed June 4, 1962, Ser. No. 199,958
3 Claims. (Cl. 74—519)

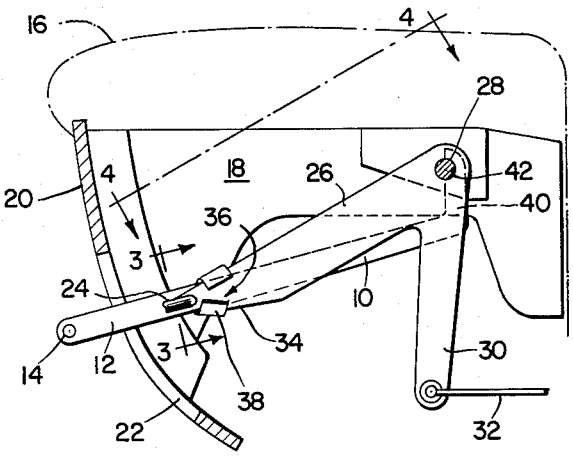

This invention relates to a replacement arm useful in repairing broken pivoted mechanical elements such as control levers. More particularly it is concerned with a replacement arm which may be readily attached to a broken control lever without removing this element from its pivot and which will become in effect an extension of the broken element replacing the broken portion. Although the particular form of the invention herein disclosed was designed as a repair or replacement arm for the handle of a bell crank lever used in the control of a heater for a certain automobile, the constructions and concepts involved may be applied to repair or replacement arms for other control levers or similar pivoted elements used for other purposes.

Pivoted levers such as those used as controls in automobiles are often located in a crowded space and for the sake of appearance sometimes are extended through narrow slots in escutcheon plates or similar ornamental structures on the dash of the car. Unfortunately, the requirements of space and appearance frequently result in constructions where the end of the control lever must be of a reduced size leading to a knob or handle for operating the lever. If the control handle or knob is struck a sudden blow or is pushed too hard by a strong operator, the lever may break, the break naturally occurring at the section of the lever which is of reduced size and therefore weakest. When this occurs, the usual practice is to dismount the broken lever from its pivot and substitute an entirely new lever. This is often difficult because the pivot for the lever is mounted up underneath the dash of the car and often the pivot shaft for the lever serves as a journal or pivot for other elements which should not be disturbed.

The principal object of the present invention is to provide a control lever replacement arm which may be attached to a broken control lever as an extension without requiring dismounting of the original lever element from its pivot. Another object is to provide such a replacement arm which may be secured or installed without the use of special tools. A further object is to provide a repair element which, after installation, will not become loose accidentally and in effect becomes a permanent part of the control lever for all practical purposes. If desired, the replacement arm of this invention may be applied to a lever before it is broken so that a reinforced element is produced which will be less subject to breakage than the original control lever handle.

The objects of this invention are met by providing a replacement arm of strong material with a body portion extending alongside the control lever, one end projecting beyond the usual weak section of the lever where a break might occur, and the other end being provided with a hook. Intermediate its ends the replacement arm has a socket fitting over the end or a portion of the broken lever. The end hook on the arm, above noted, is arranged to be forced over the pivot axis for the broken lever, pulling the socket on the arm firmly against the lever and locking the replacement arm and the lever against transverse and longitudinal movement with respect to each other.

Other objects and further details of that which is believed to be novel and included in this invention will be clear from the following description and claims, taken with the accompanying drawing in which is illustrated an example of replacement arm embodying the present invention and incorporating the socket and end hook above discussed.

In the drawings:
FIG. 1 is a vertical sectional view through a portion of the dash of an automobile showing a broken pivoted control lever and an exemplary replacement arm applied thereto according to this invention;
FIG. 2 is a similar section but limited to showing the relationship of the broken lever and the replacement arm with respect to the pivot shaft when the arm is in the process of being applied to the lever;
FIG. 3 is a transverse section on the line and in the direction of the arrows 3—3 of FIG. 1 showing how the end of the broken lever fits within the socket on the replacement arm, and
FIG. 4 is a partial top plan view of the pivot shaft for the control lever, showing how this lever and a replacement arm are secured thereto and to each other.

In carrying out the objects of this invention, in one embodiment thereof the replacement arm is in the form of a flat elongated body 10 preferably blanked or cut from cold rolled sheet steel. One end 12 of the body, which is regarded as the handle end, may be provided with a hole 14 to which a knob, button or grip (not shown) may be suitably secured after assembly of the replacement arm on the control lever.

In the setting illustrated for the invention in the drawing, the dashboard 16 of an automobile is indicated in broken lines, and underneath the dash is suitably mounted a framework 18, in this case the framework surrounding and supporting the controls for the heater unit in the automobile. Extending downwardly from the dash and on the framework is a curved escutcheon plate 20 having one or more slots 22 therein through which a reduced size handle section 24 of a control lever 26 normally extends. The handle section 24 is shown as broken off short, so that a repair or replacement is needed. The control lever, 26, shown here as a bell crank, is journaled on a pivot shaft 28 under the dashboard, in the frame 18. One leg of the bell crank may extend downwardly as at 30 and be connected as by a push rod, wire, or cable 32 to mechanisms which are to be controlled by the position of the control lever. In some cases several control levers like 26 may be mounted close together on a single pivot shaft, with their reduced section ends extending through a plurality of parallel adjacent slots 22. For this reason, the main part of the control lever is often of substantially flat form, and advantage is taken of this fact in the exemplary form of the invention here shown.

Where a flat control lever is reduced in size to the handle section 24, its width must be reduced and a tapered edge or shoulder 34 is thus provided which may be used to locate and secure the replacement arm on the lever. With the dimensions and angle of the tapered or shoulder portion known, the replacement arm is provided with a tapered socket 36 on one side of the arm matching the tapered edge or shoulder portion of the control lever. A simple and inexpensive way of forming this socket is shown, and this includes outwardly extending opposed wings or tabs 38 integral with the body of the replacement arm intermediate its ends, the tabs being bent across one side of the arm, around the edges of the control lever, to form opposed hooks.

When a replacement arm according to this invention is to be installed on a broken control lever, the arm is placed flatwise alongside a flat side surface of the control lever, the handle end 12 extending beyond the break at 24 and through a slot 22, with the tapered socket positioned beyond the beginning of the tapered edge or shoulder portion of the control lever. In completing the assembly, the replacement arm is then slid in a direction toward the pivot shaft 28 for the control lever, a hook portion 40 on the inner end of the replacement arm approaching the pivot shaft as shown in FIG. 2 as the socket engages over the edge or shoulder 34. A semi-circular recess or dwell 42 is provided on the inside or inner edge of the hook facing toward the tapered socket 36, and the material of the replacement arm is sufficiently resilient so that, with proper pressure on the edge of the replacement arm near the bend of the hook portion, the hook will be forced to spring outwardly slightly, ride over the pivot shaft and then snap the recess 42 into secure engagement over the pivot shaft on the side thereof opposite the socket 36 alongside the control lever as shown in FIG. 4. The resilience of the material of the replacement arm is such and the precise dimension between the tapered socket 36 and the recess 42 is so chosen that after the assembly is complete, the hook will pull and wedge the socket firmly into engagement with the tapered edge or shoulder 34 on the control lever. Thereafter, it is extremely difficult to remove the replacement arm from the control lever and accidental disengagement is prevented for all practical purposes although the replacement arm may be used to move and control the position of the control lever.

It will be noted that the handle end 12 of the replacement arm extends well beyond the broken end 24 of the control lever and the widest transverse dimension of the arm is in the plane of swing of the combined arm and lever. Being made of strong material to start with, the replacement element therefore becomes a rugged and permanent part of the assembly to which it is connected.

The hook portion 40 need not engage or bear directly around the pivot shaft 28 but may be hooked around a bushing or some other element which can pivot with the lever coaxially on the axis of the pivot shaft. The function of the hook is to draw the socket into engagement with the broken end of the control lever and to lock it in that position against longitudinal movement while the combined replacement and control lever are pivoted together about the shaft. Engagement of the socket with the end of the lever prevents transverse movement between the locked elements.

As will be evident from the foregoing description, certain aspects of this invention are not limited to the particular details set forth as an example, and it is contemplated that various and other modifications and applications of the invention will occur to those skilled in the art. It is therefore intended that the appended claims shall cover such modifications and applications as do not depart from the true spirit and scope of the invention.

What is claimed as new and is desired to be secured by Letters Patent of the United States is:

1. A replacement arm for a lever which is journaled on a pivot axis and has a tapered portion leading to a reduced size section subject to breakage,
   said arm adapted to be secured as an extension to a said lever broken at said reduced size section and comprising
   an elongated body extending alongside the lever with a first end projecting beyond the reduced size section of the lever,
   a tapered socket on said body slidably engaged with the tapered portion of the lever,
   a resilient hook at the other end of said body, the inside of said hook facing said tapered socket,
   said hook being located and positioned to be sprung and engaged over the pivot axis of the lever when said socket is engaged with the tapered portion of the lever,
   whereby said hook holds said socket resiliently engaged with the tapered portion and locks said replacement arm body and the lever against transverse and longitudinal movement with respect to each other.

2. A replacement arm for a substantially flat control lever which is journaled on a pivot shaft and has a tapered edge portion leading to a reduced size handle section subject to breakage,
   said arm adapted to be secured as an extension to a said control lever broken at said reduced size section and comprising
   an elongated flat body extending alongside the control lever with a first end projecting beyond the reduced size handle section of the lever,
   a pair of opposed tabs integral with said body forming a tapered socket slidably engaged over the tapered edge portion of the control lever,
   a resilient hook at the other end of said body having a dwell therein facing said tapered socket formed by said tabs,
   said hook dwell being located and positioned to be sprung and engaged over the pivot shaft of the control lever alongside the lever when said socket is engaged over the tapered edge portion of the lever.

3. A replacement arm for a substantially flat lever which is journaled on a pivot shaft and has an edge shoulder portion leading to a handle section subject to breakage,
   said arm adapted to be secured as an extension to a said lever broken at said handle section and comprising
   an elongated flat resilient sheet metal body extending flatwise alongside the lever with a first handle end projecting beyond the broken handle section of the lever,
   a hook integral with the other end of said body having a semi-circular recess therein near said end,
   a pair of opposed hooks extending integrally from one side of said body intermediate its ends and engaged over the lever at its edge shoulder portion,
   said end hook recess being so located and positioned as to be sprung and engaged over the pivot shaft of the lever when said intermediate opposed hooks are engaged over the lever at its edge shoulder portion.

References Cited in the file of this patent

UNITED STATES PATENTS

| 996,717 | Hoyer | July 4, 1911 |
| 1,509,031 | Sandstorm | Sept. 16, 1924 |
| 1,663,606 | Murphy | Mar. 27, 1928 |
| 1,793,926 | Green | Feb. 24, 1931 |
| 2,561,556 | Bell | July 24, 1951 |
| 2,949,043 | Fichter et al. | Aug. 16, 1960 |

FOREIGN PATENTS

| 616,865 | France | Nov. 6, 1926 |
| 264,925 | Great Britain | Jan. 28, 1927 |